Dec. 22, 1953    A. W. KAMMERER    2,663,546
ROTARY DRILL BIT AND CUTTER
Filed Feb. 9, 1951    2 Sheets-Sheet 1
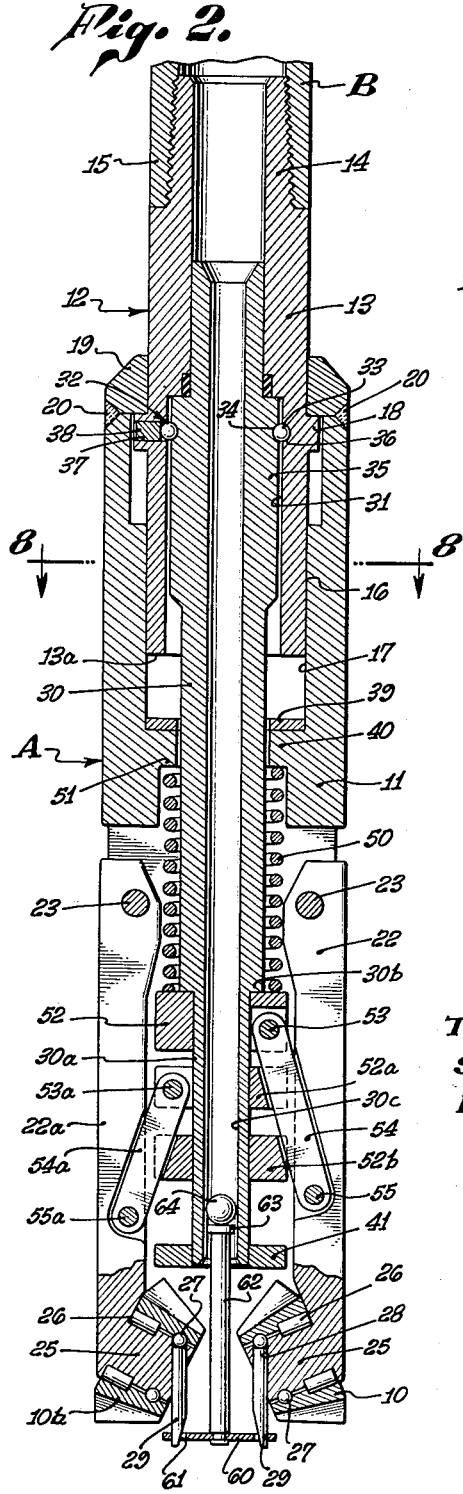
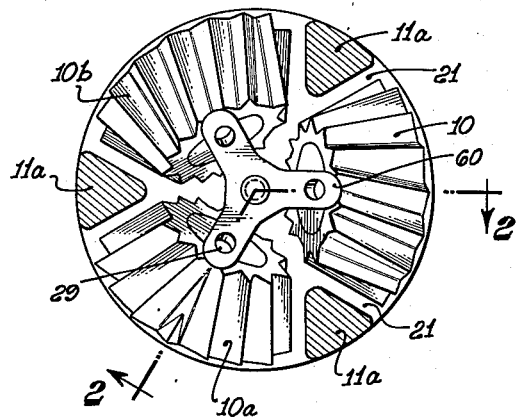
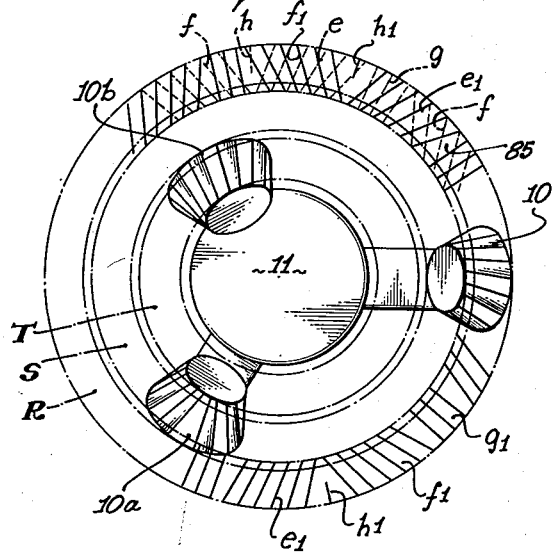
ARCHER W. KAMMERER,
INVENTOR.
BY
Bernard Kriegel
ATTORNEY.

Dec. 22, 1953 A. W. KAMMERER 2,663,546
ROTARY DRILL BIT AND CUTTER
Filed Feb. 9, 1951 2 Sheets-Sheet 2
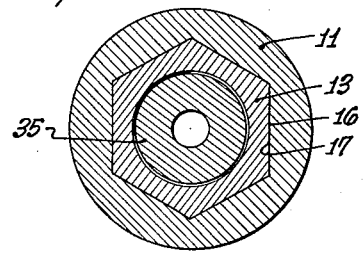
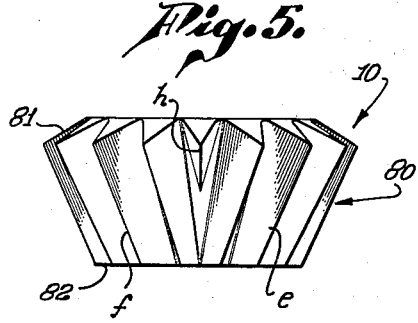
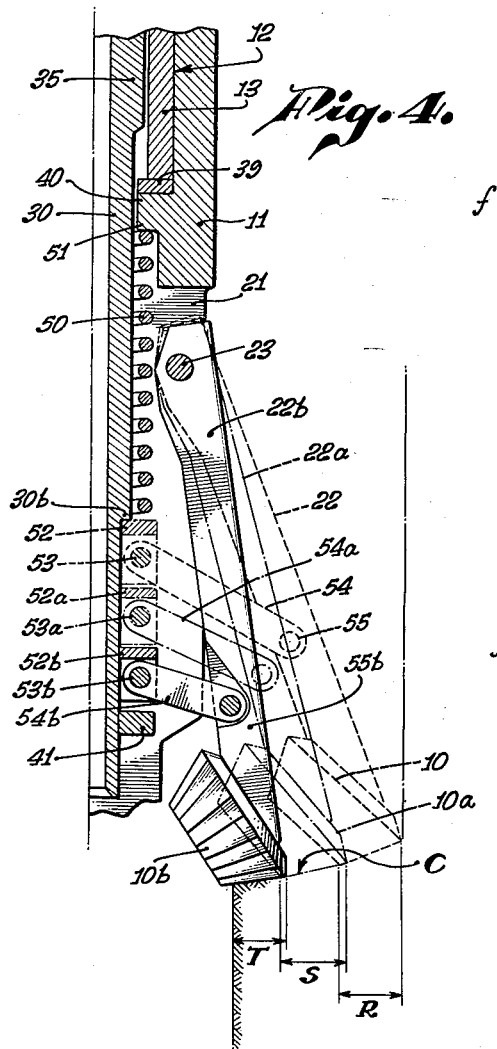
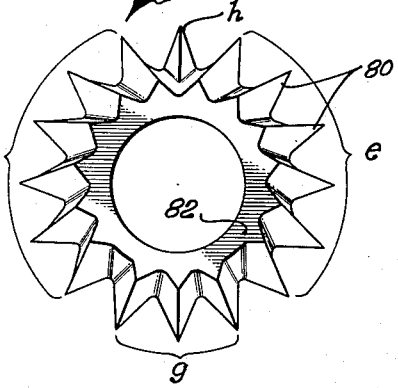
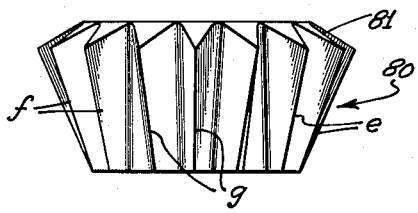
ARCHER W. KAMMERER,
INVENTOR.
BY
Bernard Kriegel
ATTORNEY.

Patented Dec. 22, 1953

2,663,546

UNITED STATES PATENT OFFICE 2,663,546

ROTARY DRILL BIT AND CUTTER

Archer W. Kammerer, Fullerton, Calif.

Application February 9, 1951, Serial No. 210,140

5 Claims. (Cl. 255—76)

The present invention relates to bits for drilling wells, and more particularly to rotary drill bits having toothed roller cutters.

In the drilling of well bores through use of rotary drill bits embodying one or more tooth roller cutters, the formation material is removed mainly by a chisel-like action of the cutter teeth as they roll upon the face of the formation. The teeth are more effective when they can penetrate the formation properly and adequately, but their effectiveness is diminished in the event the cutter teeth track into previously formed impressions or indentations in the formation made by the same or other cutter teeth. Such tracking problems are especially encountered in drill bits in which a path on the formation is traversed by only a single toothed roller cutter.

Accordingly, it is an object of the present invention to provide a rotary drill bit embodying a toothed roller cutter, whose teeth are arranged in such manner that they do not track into indentations in the formations that have been produced previously.

Another object of the invention is to provide a roller cutter for a rotary drill bit having some teeth that do not track into indentations or impressions formed by other teeth of the same cutter.

A further object of the invention is to provide a rotary drill bit having a toothed roller cutter which alone traces a path on the formation, and in which tracking of the cutter teeth into indentations in the formation which they have previously formed is eliminated or greatly minimized.

Still another object of the invention is to provide a rotary drill bit having a toothed roller cutter which alone traces a path on the formation, in which the teeth of the cutter are capable of producing a crisscross pattern of indentations in the formation, thereby facilitating removal of the formation material, especially when it is hard.

Yet a further object of the invention is to provide a roller cutter for a rotary drill bit having teeth capable of producing a crisscross pattern of indentations in the formation.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a bottom plan view of the drill bit shown in Fig. 2;

Fig. 2 is a longitudinal section through the drill bit, taken along the line 2—2 on Fig. 1, with the bit cutters in retracted position;

Fig. 3 is a diagrammatic cross-section looking upwardly, illustrating the location of the cutters when in their respective expanded positions operating upon different portions of the formation shoulder produced in the well bore;

Fig. 4 is a somewhat diagrammatic view, illustrating the different extents of expansion of the cutters, and their manner of operating upon the formation shoulder which is produced in the well bore;

Fig. 5 is a side elevation of one of the roller toothed cutters;

Fig. 6 is a bottom plan view of the cutters shown in Fig. 5;

Fig. 7 is a side elevation of the cutters shown in Fig. 5, as seen from the opposite side thereof;

Fig. 8 is a cross-section taken along the line 8—8 on Fig. 2.

The drill bit disclosed in the drawings is particularly described and claimed in my application for "Multiple Expansion Rotary Drill Bits," Serial No. 180,167, filed August 18, 1950, although in its broader aspects the invention is applicable to other specific types of rotary drill bits.

As shown in the drawings, the drill bit A may be attached to the lower end of a string of drill pipe B by means of which the bit can be lowered through a well casing (not shown), for the purpose of greatly enlarging the well bore below the casing shoe (not shown). The drill bit cutters 10, 10a, 10b are expanded outwardly to different extents, for the purpose of producing an annular formation shoulder C in the well bore, the cutters operating upon different annular portions R, S, T of this shoulder, for the purpose of collectively enlarging the diameter of the well bore to the desired extent.

The drill bit A includes an elongate main body 11, in which a tubular member 12 is piloted. The upper portion of this member is constituted by a kelly 13 having an upper threaded pin 14 screwed into a sub 15, which may form the lowermost portion of the drill pipe B. The drill stem member 13 itself is slidably splined in the upper portion of the body, as by forming the exterior 16 of the kelly of hexagonal shape, fitting within a corresponding hexagonal socket 17 in the body. The drill stem member is provided with an external flange 18 fitting within the body, and serving the purpose of holding the drill stem member within the body. After the drill stem member 13 has been placed into the upper end of the body 11, a retainer ring 19 may be disposed over the member above its flange 18 and secured to the upper end of the body, as by use of welding material 20, in order to prevent upward withdrawal of the kelly 13 from the body 11.

The body has a plurality of depending leg portions 11a defining longitudinal transverse body slots 21, in which cutter supporting members 22, 22a, 22b are disposed. These cutter supporting members are preferably equi-angularly spaced around the bit axis and have their upper ends mounted on pivot or hinge pins 23 extending across the body slots 21 and suitably secured to the body, as by welding. The cutter supporting legs 22, 22a, 22b depend from their hinge pins 23 to a substantial extent. They each have a bearing supporting pin 25 at the lower end, on which a roller side cutter 10, 10a or 10b is rotatably mounted. Antifriction roller and ball bearing elements 26, 27 are disposed between each bearing supporting pin 25 and cutter 10, 10a or 10b, to reduce the friction therebetween. The ball bearing elements 27 also serve to retain the cutter on the bearing supporting pin.

The balls 27 may be inserted between each cutter 10, 10a or 10b and its associated pin 25 through a passage 28 in the latter, which is closed by a suitable plug 29 welded, or otherwise suitably secured, to the pin.

The bearing supporting members 22, 22a, 22b, and their cutters 10, 10a, 10b, may occupy retracted positions substantially entirely within the confines of the main bit body 11, or they may be expanded outwardly of the body to a larger effective diameter than the inside diameter of a casing string (not shown) through which the bit is moved, for the purpose of enlarging the well bore below the casing shoe (not shown). In expanding the cutters 10, 10a, 10b, their supporting legs 22, 22a, 22b are swung outwardly about the hinge pins 23 to a predetermined extent.

The device for holding the cutters expanded includes a lower tubular member 30, which actually forms part of the mandrel 12, and which is piloted within a lower socket 31 in the kelly 13. The kelly 13 and lower tubular member 30 are assembled together for joint longitudinal movement by a swivel connection 32, which enables the lower tubular member to move angularly with respect to the upper kelly. Such swivel connection may include ball bearing elements 33 mounted in a raceway 34 formed on an enlarged portion 35 of the lower member 30, the ball bearing elements also being rollable in an internal raceway 36 formed in the kelly itself. The balls may be inserted in place through a passage 37 extending through the Kelly flange 18. After the required number of balls have been mounted in the raceways 34, 36, they are held in assembled position by a plug 38 in the passageway 37, which is prevented from inadvertent outward movement from the passageway by engaging the main bit body 11.

The lower tubular member 30 depends from its boss portion 35 through a guide and thrust member 39, which rests upon a shoulder 40 formed on the body. This thrust member initially is disposed below the lower end of the key 13, so as to allow the kelly 13 and tubular member 30 to be moved downwardly, for the purpose of holding the cutters 10, 10a, 10b and their supporting members 22, 22a, 22b in an outward position, resisting inward movement of the cutters from their outward position, and, under some conditions, actually shifting the cutters to their outwardly expanded position. The lower end of the mandrel member 30 is slidable in a lower guide 41 integral with the body 11, and forming a support for the mandrel to resist its lateral movement.

The cutter supporting members or legs 22, 22a, 22b and the cutters may be expanded outwardly by a compressed helical expander spring 50 encompassing the tubular member 30 and bearing upon an upper seat or shoulder 51 formed in the main body of the bit. The lower end of the spring bears upon an upper thrust block 52, that has a pin 53 carrying the upper end of a link or connecting rod 54, whose lower end is pivotally mounted on a pin 55 suitably secured to the cutter supporting leg 22.

Slidable on the mandrel 30 below the upper thrust block 52 is an intermediate thrust block 52a having a pin 53a on which the upper end of a thrust link or connecting rod 54a is pivoted, the lower end of this link being pivoted on a pin 55a secured to another one of the cutter supporting members or legs 22a. Yet another or lower thrust block 52b (Fig. 4) is slidable on the mandrel below the intermediate thrust block 52a and carries the pin 53b on which the upper end of a lowermost link 54b is pivotally mounted, the lower end of this link being pivoted on a pin 55b secured to still a third cutter supporting member or leg 22b.

As illustrated, the upper, intermediate and lower thrust blocks 52, 52a, 52b are slidable on a reduced diameter lower portion 30a of the tubular member 30, the upper thrust block 52 being initially disposed adjacent a mandrel shoulder 30b, which may engage the upper portion of the upper thrust block.

One manner of expanding the cutters outwardly is to allow the compressed spring 50 to expand, which will shift the upper thrust block 52 downwardly on the mandrel 30, and, through the agency of the link 54, urge the cutter supporting leg 22 and the cutter 10 outwardly. The upper thrust block 52 will move downwardly under the influence of the spring 50 until it engages the intermediate thrust block 52a, the spring then moving both the upper and intermediate blocks 52, 52a downwardly as a unit to urge the cutter supporting legs 22 and 22a outwardly. Thereafter, as the spring 50 continues to expand, the intermediate thrust block 52a engages the lower thrust block 52b, the three blocks 52, 52a, 52b moving downwardly as a unit to urge all three of the cutter supporting legs 22, 22a, 22b and their associated cutters 10, 10a and 10b outwardly, through the agency of the intermediate connecting rods 54, 54a, 54b. The extent of expansion is limited by engagement of the lower thrust block 52b with the lower body guide 41.

The cutters 10, 10a, 10b may be locked in retracted position initially by a holding device, with the expander spring 50 fully compressed, and with the driving mandrel 12 occupying an upward position within the body 11; so as to insure downward passage of the bit through the well casing, and to enable the bit to be moved to any desired point in the well bore below the casing shoe before the hole enlarging operation is commenced. This holding device may include a holding plate 60 having holes 61 receiving the lower ends of the ball retaining plugs 29. The plate 60 will prevent outward expansion of the cutters until the former member is removed. Such removal may be effected hydraulically. Thus, a central rod 62 is secured to the plate and projects upwardly into the central passage 30c formed through the lower tubular member 30. A head 63 at the upper end of the rod fits loosely within the passage 30c, to enable fluid to flow upwardly through the tubular member passage and the Kelly passage 13b and into the drill pipe string B. A ball 64 may also be disposed in the passage 30c, or may be dropped down the drill pipe B when the cutters are to be expanded, this ball having a diameter substantially equal to the diameter of the passage 30c; so as to function as a piston and enable the fluid under pressure within the drill pipe B and drill bit to force the central rod 62 downwardly and remove the holding plate 60 from the plug elements 29, whereupon the cutters 10, 10a, 10b and their supporting members 22, 22a, 22b can be shifted laterally outward, either by the expander spring 50, the driving mandrel 12, or both.

It is desired to have each of the cutter members operate upon a particular annular portion of the formation shoulder. Thus, the cutter member 10 is to operate around the annular portion R of the shoulder (see Fig. 4); the cutter member 10a is to operate upon the annular portion S of the shoulder; and the cutter member 10b is to operate upon the annular portion T of the shoulder. Inasmuch as these annular portions are disposed different lateral distances from the axis of the well bore, the cutters are to be expanded outwardly different amounts to locate each cutter at its proper position upon the formation shoulder C.

Since the cutter supporting leg 22 and its cutter 10 are to be swung outwardly from their fully retracted position to the greatest extent, the pin connection 55 between the connecting rod 54 and the cutter supporting leg 22 is disposed a lesser distance from the hinge pin 23 of the cutter supporting leg 22, than the distance from its hinge pin of the pin connection 55a between the second cutter supporting leg 22a and its connecting rod 54a. Similarly, the distance from the hinge pin 23 for the cutter supporting leg 22b and its pin connection 55b with its connecting rod 54b is greater than the distance between the hinge pin of the second leg 22a and its pin connection 55a to its link or connecting rod 54a. Accordingly, for the same longitudinal movement, the upper thrust block 52 will swing its cutter supporting leg 22 a greater arcuate extent than the intermediate thrust block 52a will swing its cutter supporting leg 22a, and this latter thrust block will, in turn, swing the cutter supporting leg 22a a greater arcuate distance than the lower thrust block 52b swings the cutter supporting leg 22b.

Despite the fact that the lever arm distance of the pins 55, 55a, 55b connecting the rods 54, 54a, 54b to the cutter supporting members is different, it is desired to have the first cutter supporting leg 22 swing outwardly to a certain arcuate extent before the intermediate supporting leg 22a commences moving outwardly from its retracted position. Also, this intermediate leg 22a is to swing outwardly from its fully retracted position to a certain extent before the remaining leg 22b and its cutter 10b commences moving outwardly. To accomplish this purpose, the intermediate thrust block 52a is initially spaced downwardly from the upper thrust block by a certain distance; so that the upper thrust block 52 must move downwardly through this distance and swing its cutter supporting leg 22 and cutter 10 outwardly before the upper thrust block 52 engages the intermediate thrust block 52a, to commence outward swinging of the intermediate leg 22a and cutter 10a. Similarly, a longitudinal space exists initially between the intermediate and lower thrust blocks 52a, 52b, to require the intermediate thrust block 52a to swing the intermediate cutter 10a outwardly to a certain arcuate extent before it engages the lower thrust block 52b and shifts the latter downwardly, to effect outward swinging of the cutter supporting leg 22b and cutter 10b.

Thus, the upper thrust block 52 will move downwardly to shift the cutter 10 outwardly, and while the drill string and bit is rotating, cause the cutter to start producing the formation shoulder C. After the inner portion T of this formation shoulder is formed by the outward expansion of the cutter 10, the upper thrust block 52 will then engage the intermediate thrust block 52a and commence shifting the intermediate cutter 10a outwardly. The first cutter 10 has been expanded outwardly to a greater extent than the second cutter 10a and will remain in this advanced position during rotation of the drill bit, whereby the first cutter 10 enlarges the formation shoulder C to a still greater lateral extent as by commencing to operate upon the formation shoulder portion S. The second cutter 10a, during further outward swinging of the first cutter 10, will be disposed over the inner portion T of the formation shoulder. As the two thrust blocks 52, 52a move downwardly as a unit along the mandrel 30, to expand their cutters 10, 10a outwardly, the intermediate block engages the lower thrust block 52b and commences urging the remaining cutter supporting leg 22b and cutter 10b outwardly. Inasmuch as all three thrust blocks are contacting one another, they will swing outwardly simultaneously, the first supporting member 22 and its cutter 10 leading the second supporting member 22a and its cutter 10a in lateral extent, and the second cutter supporting member and its cutter, in turn, leading the remaining supporting member 22b and its cutter 10b in lateral extent. The blocks all continue moving downwardly to their maximum extent, the first cutter 10 swinging across and producing the entire formation shoulder C, and finally being capable of rolling around the outermost annular portion R of the shoulder. The second cutter 10a is capable of rolling around the intermediate annular portion S of the shoulder, and the third cutter 10b is capable of rolling around the inner annular portion T of the shoulder.

After the thrust blocks have been shifted downwardly by the spring 50, the production of the full shoulder C will enable the operator to lower the drill pipe B slightly, to telescope the mandrel 12 within the body 11 until the lower end 13a of the kelly 13 engages the thrust washer 39. The drilling weight can then be imposed directly through the kelly 13 onto the body 11, and through the hinge pins 23 and supporting members 22, 22a, 22b to the cutters 10, 10a, 10b. At the same time, the mandrel shoulder 30b is disposed immediately adjacent the upper thrust block 52, in order to hold all of the thrust blocks in their downward position and preclude the reactive forces of the formation on the cutters from urging the latter inwardly to a position in which they would drill an undersized hole. In effect, the mandrel shoulder 30b locks or retains the cutters outwardly to their maximum expanded positions.

The tool A is assembled with the parts occupying the positions illustrated in Fig. 2, the holding plate 60 securing the cutters 10, 10a, 10b in retracted position, with the spring 50 under maximum compression. The tubular mandrel 12 is disposed upwardly with respect to the body 11, as limited by engagement of the Kelly flange 18 with the retainer ring 19. The bit is attached to the drill pipe B and lowered in the well bore.

When the location in the bore hole below the casing shoe has been reached at which the underreaming or hole enlarging operation is to commence, the pumps at the top of the well bore are started and the fluid in the drill pipe B subjected to pressure. This pressure acts upon the ball 64 and forces both the ball and the central rod 62 out of the passage 30c, which removes the holding plate 60 from the plug elements 29 and allows the entire holding device to be ejected from the bit, leaving the passage 30c free and allowing the circulating fluid to exit from the lower end of the passage into the well bore, for the purpose of cleaning the cutters and washing the cuttings upwardly to the top of the well bore.

After the holding device has been removed, the spring 50 can expand. This expanding action first urges the upper block 52 downwardly, and, through the thrust link 54, swings the first cutter 10 outwardly, forcing the cutter 10 against the wall of the formation. The drill pipe and the rotary drill bit are then rotated at the proper speed, without imposing drilling weight on the pipe and bit, the single cutter 10 digging into the wall of the formation and commencing the production of the inner portion T of the shoulder C therein under the influence of the spring 50. As the spring expands, as a result of outward movement of the first cutter 10, the upper block 52 moves down until it engages the intermediate thrust block 52a, which then urges the second cutter supporting member 22a and cutter 10a outwardly. The spring 50 continues its expansion, simultaneously shifting the first and second cutter supporting members 22, 22a and their associated cutters 10, 10a outwardly, the first cutter 10 leading the second cutter 10a and continuing to enlarge the lateral extent of the formation shoulder, commencing the production of the intermediate portion S of the shoulder during rotation of the drill bit.

As the two cutters continue their outward movement, as a result of expansion of the spring and downward movement of the upper and intermediate thrust blocks, the intermediate block 52a finally engages the lower thrust block 52b, which is urged downwardly to swing the third cutter supporting member 22b and cutter 10b outwardly. Rotation of the drill bit is continued, the spring 50 shifting all three blocks downwardly together and urging the cutters outwardly, the first cutter continuing the formation of the shoulder by producing the outermost portion R of the latter. When the lower block 52b engages the lower body guide 41, the cutters 10, 10a, 10b are precluded from swinging outwardly to any further extent, but they are then located with the outermost cutter 10 disposed upon the outermost portion R of the shoulder, the intermediate cutter 10a on the intermediate portion S of the shoulder, and the innermost cutter 10b upon the innermost portion T of the shoulder. The annular paths R, S, T traced by the cutters upon the formation shoulder C during rotation of the bit preferably overlap one another to a slight extent, to insure that the cutter teeth will operate upon all portions of the formation shoulder.

After the formation shoulder has been produced, primarily by the outermost cutter 10, down weight or drilling weight may be imposed on the drilling string B, which will telescope the mandrel 12 in the body 11 and shift the lower end 13a of the kelly 13 into engagement with the thrust washer 39, the drilling weight then being transmitted directly through the body 11 to the cutter supporting members 22, 22a, 22b and the cutters 10, 10a, 10b. During the imposition of the drilling weight, the bit is rotated at the proper speed, the cutters operating upon their individual annular portions of the shoulder to remove the formation material in a downward direction, effecting the hole enlarging to the desired greatly increased diameter. As mentioned above, the downward telescoping of the driving mandrel 12 in the body 11 also locates the mandrel shoulder 30b immediately adjacent the upper thrust block 52, to prevent any substantial retraction of the cutters from their maximum expanded positions.

When the well bore has been enlarged to the desired length, or upon the cutters becoming dull, the entire tool may be removed from the well bore merely by elevating the drill string B. Such elevating movement will lift the driving mandrel 12 within the main bit body 11 and will raise the mandrel shoulder 30b above the upper thrust block 52. As the tool passes into an upper lesser diameter portion of the well bore, or into the well casing, the walls of the casing or well bore will engage the cutter supporting legs 22, 22a, 22b, and force them inwardly against the action of the expander spring 50. The cutter supporting members will ride the wall of the casing during removal of the bit to the top of the well bore.

In the type of drill bit described above, there is only a single cutter rolling around each annular portion of the formation shoulder C. Limitations in space in the type of tool disclosed prevent the use of more than one cutter for operation upon each annular shoulder portion, since the cutters must be disposed in retracted position in being moved longitudinally through the well casing. If the teeth on each frusto-conical cutter were all disposed in substantially the same relation to the cutter axis, such teeth might tend to track into indentations or impressions that they have previously formed in the formation shoulder C, which would diminish the extent of their penetration into the formation and would also retard the rate at which the cutter could drill away the formation material and make or enlarge the hole.

By virtue of the present invention, such tracking is minimized and the drilling effectiveness of each cutter is enhanced to a considerable extent.

As shown in the drawings, each cutter 10, 10a, 10b is of generally frusto-conical form, having teeth 80 disposed around its periphery. Each tooth has a back face 81, for operation upon the side wall of the hole, and each tooth tapers toward the smaller end 82 of the frusto-conical cutter, in a manner similar to a bevel gear. Instead of all teeth on each cutter being arranged substantially alike with respect to the axis of the cutter, one set or group of teeth $e$ is helically disposed or arranged; so as to lie in planes making an angle with radial planes through the cutter axis. Another set of helical teeth $f$ is also provided on the cutter, but such teeth are inclined in the opposite direction to the first set of teeth $e$. Each set of teeth $e, f$ extends partially around the circumference of the cutter. At one side of the cutter the sets of teeth may be separated by one or more other teeth $g$ which may be disposed radially of the cutter axis, or at some other angle to radial planes of the cutter that is substantially different from the angles that the teeth $e$ and $f$ make with such radial planes. On the opposite side of the cutter from the location of the straight radial teeth $g$, a tooth $h$ of partial length may extend from the larger end of the cutter toward the smaller end 82. This tooth $h$ fills the gap that might exist between the end tooth of one helical set $e$ and the end tooth of another set $f$.

As each cutter rolls around its exclusive annular portion R, S or T of the formation shoulder C, the teeth make indentations in such annular portion, chipping away the formation material (Fig. 3). One set of teeth $e$ will form indentations $e^1$ inclined in one direction to radii extending from the axis of the well bore. Another set of inclined teeth $f$ will produce oppositely inclined indentations $f^1$ in the formation shoulder which are disposed at an angle to the well bore radii. In between such inclined indentations, the set of teeth $g$ will form indentations $g^1$, which are disposed at an angle to the indentations $e^1$ and $f^1$; whereas the single partial tooth above will form an indentation $h^1$ between the sets of indentations $e^1$ and $f^1$.

As a cutter rolls around the face of its particular annular portion R, S or T of the formation shoulder C, as a result of a plurality of revolutions of the drill bit during the hole enlarging operation, the teeth of each set will cross the indentations or impressions produced in the face of the formation by the teeth of another set. For example, the teeth $e$ will cross the indentations $f^1$ and $g^1$, providing a crisscross pattern 85 that will facilitate breaking down of the formation into particles and its flushing from the well bore. Similarly, the teeth $f$ will cross the indentations $g^1$ and $e^1$ at a substantial angle thereto; whereas, the teeth $g$ will cross the indentations $e^1$ and $f^1$ at a substantial angle thereto.

These teeth $e, f$ and $g$ will likewise operate upon the indentations $h^1$ produced by the partial tooth $h$; whereas, this latter tooth will also crisscross the indentations $e^1, f^1, g^1$ formed by the other teeth.

It is, accordingly, apparent that the teeth of the cutter do not track into the same impressions or indentations produced in the face of the annular portion of the formation shoulder. Instead, the teeth crisscross the impressions made by one another, which more readily chips or chisels away the formation material. This action is of particular importance in drilling bits in which only a single cutter is available for operation upon a particular face R, S or T of the formation, inasmuch as no other cutter is operable upon such formation face.

The inventor claims:

1. In a rotary drill bit: a body; first cutter means mounted on said body for lateral movement with respect to said body; second cutter means mounted on said body for lateral movement with respect to said body; means engaging said first cutter means and said second cutter means for positively shifting said first cutter means laterally to a greater maximum extent from the axis of said body than said second cutter means; said first cutter means including a first roller cutter which alone traverses an orbital path on the formation during rotation of said body about the body axis; said second cutter means including a second roller cutter which alone traverses an orbital path on the formation within said other orbital path during rotation of said body about the body axis; each of said cutters having peripheral teeth lying in a plane normal to the cutter axis, which teeth are disposed at an angle to other peripheral teeth lying in said plane.

2. In a rotary drill bit: a body; first cutter means mounted on said body for lateral movement with respect to said body; second cutter means mounted on said body for lateral movement with respect to said body; means engaging said first cutter means and said second cutter means for positively shifting said first cutter means laterally to a greater maximum extent from the axis of said body than said second cutter means; said first cutter means including a first roller cutter which alone traverses an orbital path on the formation during rotation of said body about the body axis; said second cutter means including a second roller cutter which alone traverses an orbital path on the formation within said other orbital path during rotation of said body about the body axis; each of said cutters having a set of helical formation engaging teeth inclined in one direction to planes radiating from the cutter axis and a set of helical teeth inclined in the opposite direction to such planes.

3. In a rotary drill bit: a body; first cutter means mounted on said body for lateral movement with respect to said body; second cutter means mounted on said body for lateral movement with respect to said body; means engaging said first cutter means and said second cutter means for positively shifting said first cutter means laterally to a greater maximum extent from the axis of said body than said second cutter means; said first cutter means including a first roller cutter which alone traverses an orbital path on the formation during rotation of said body about the body axis; said second cutter means including a second roller cutter which alone traverses an orbital path on the formation within said other orbital path during rotation of said body about the body axis; each of said cutters having a set of helical formation engaging teeth inclined in one direction to planes radiating from the cutter axis, a set of helical formation engaging teeth inclined in the opposite direction to such planes, and a set of teeth inclined to said other sets of teeth.

4. In a rotary drill bit: a body; first cutter means mounted on said body for lateral movement with respect to said body; second cutter means mounted on said body for lateral movement with respect to said body; means engaging said first cutter means and said second cutter means for positively shifting said first cutter means laterally to a greater maximum extent from the axis of said body than said second cutter means; said first cutter means including a first roller cutter which alone traverses an orbital path on the formation during rotation of said body about the body axis; said second cutter means including a second roller cutter which alone traverses an orbital path on the formation within said other orbital path during rotation of said body about the body axis; each of said cutters being frusto-conical and having a set of helical formation engaging teeth inclined in one direction to planes radiating from the cutter axis and a set of helical formation engaging teeth inclined in the opposite direction to such planes.

5. In a rotary drill bit: a body; first cutter means mounted on said body for lateral movement with respect to said body; second cutter means mounted on said body for lateral movement with respect to said body; means engaging said first cutter means and said second cutter means for positively shifting said first cutter means laterally to a greater maximum extent from the axis of said body than said second cutter means; said first cutter means including a first roller cutter which alone traverses an orbital path on the formation during rotation of said body about the body axis; said second cutter means including a second roller cutter which alone traverses an orbital path on the formation within said other orbital path during rotation of said body about the body axis; each of said cutters being frusto-conical and having a set of helical formation engaging teeth inclined in one direction to planes radiating from the cutter axis, a set of helical formation engaging teeth inclined in the opposite direction to such planes and a set of formation engaging teeth inclined to said other sets of teeth.

ARCHER W. KAMMERER.

References Cited in the file of this patent

UNITED STATES PATENTS

| Number | Name | Date |
|---|---|---|
| 959,539 | Hughes | May 31, 1910 |
| 1,667,155 | Higdon | Apr. 24, 1928 |
| 1,708,932 | Brown | Apr. 16, 1929 |
| 1,821,473 | Mercer | Sept. 1, 1931 |
| 2,085,336 | Sandstone | June 29, 1937 |

FOREIGN PATENTS

| Number | Country | Date |
|---|---|---|
| 534,103 | Germany | Sept. 23, 1931 |